June 10, 1941.  G. W. MARTIN  2,245,000
INSPECTING AND TRIMMING TABLE
Filed June 5, 1939   2 Sheets-Sheet 2
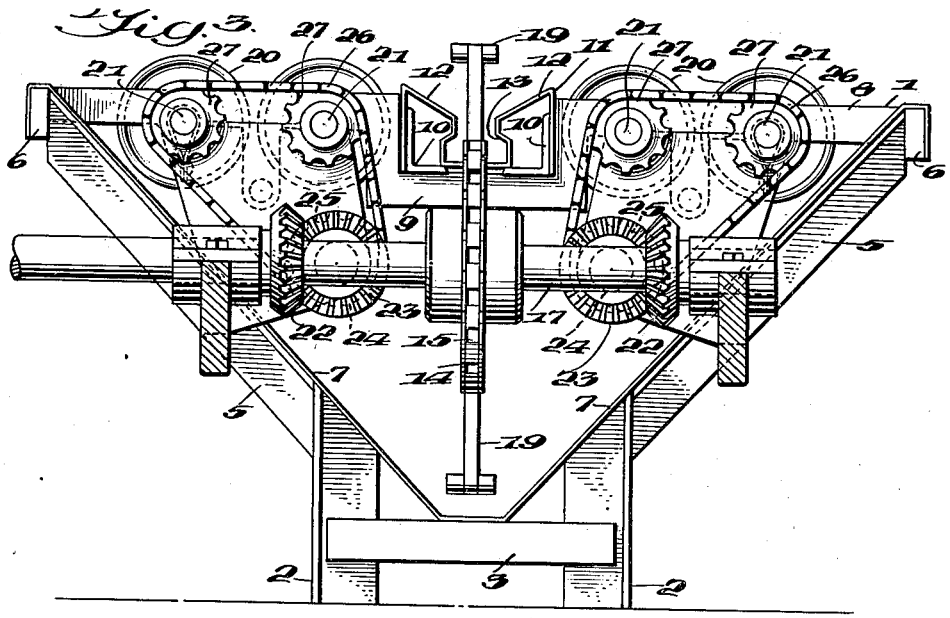
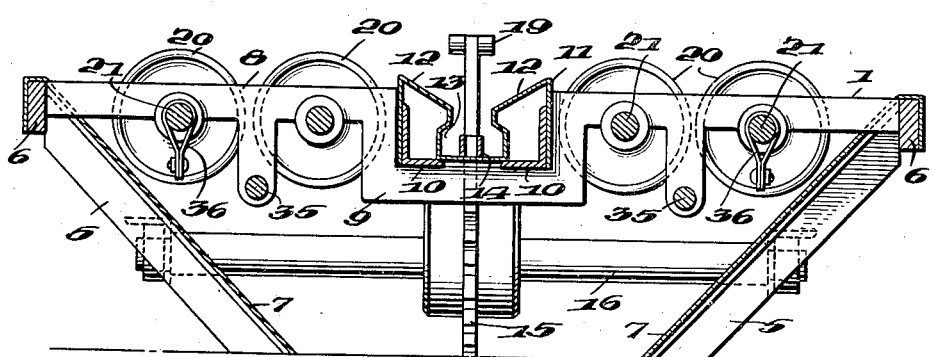
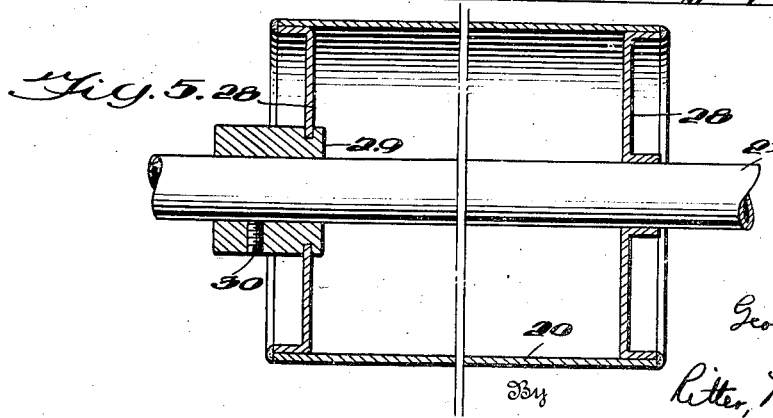

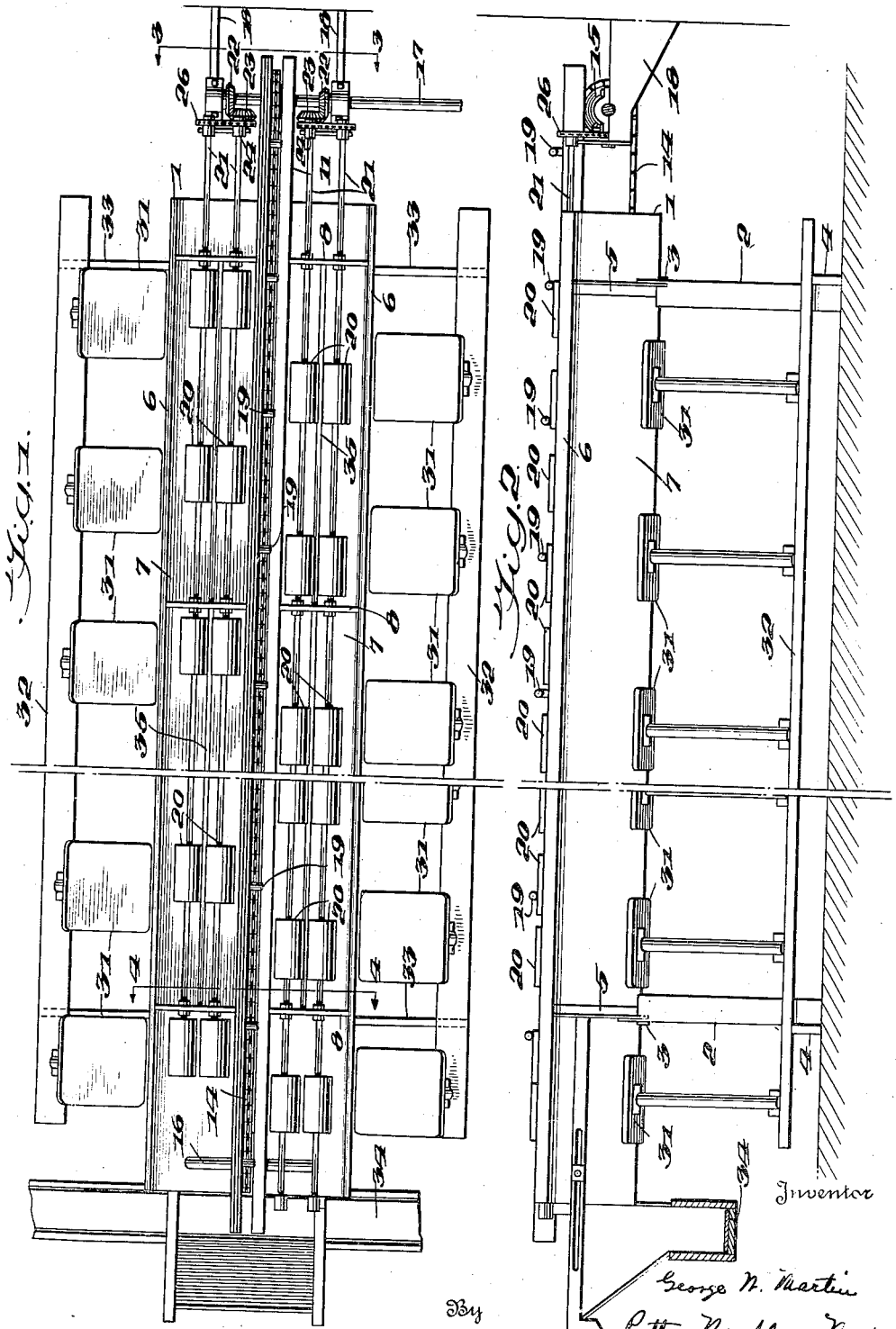

Patented June 10, 1941

2,245,000

UNITED STATES PATENT OFFICE 2,245,000

INSPECTING AND TRIMMING TABLE

George W. Martin, Kalaheo, Territory of Hawaii, assignor to Kauai Pineapple Company, Ltd., Kalaheo, Territory of Hawaii, a corporation of Hawaii Application June 5, 1939, Serial No. 277,558

4 Claims. (Cl. 146—214)

My invention relates to improvements in inspecting and trimming tables for fruit, particularly pineapple, and it has for its principal object the provision of means whereby the pineapple after being partially processed may be easily inspected and trimmed with a minimum of labor and handling of the fruit.

In the present practice of canning pineapple, the fruits are first fed into a Ginaca machine which, in addition to coring the fruit, removes both of its ends and its outside shell or skin so that, upon leaving the machine, the pineapples are of uniform cylindrical shape. As it frequently happens that all of the skin is not removed from the fruit in the Ginaca machine and occasionally some of the fruits have imperfections, the pineapple cylinders pass from the Ginaca machine to a conveyer by which the fruit is advanced along a trimming and inspecting table on its way to the mechanism customarily employed to slice the fruit.

Prior to my invention, it has been necessary in order to inspect and trim the pineapple cylinders to lift each one from the conveyer, rotate it while being held in one hand and trim off objectionable portions with a knife held in the other hand. To do this satisfactorily requires considerable skill and on account of the manual labor involved it is not only fatiguing to those engaged in the work but tends to slow up production.

By the present invention, the inspecting and trimming operations of the pineapple cylinders as they are conveyed from the Ginaca machine to the slicer are greatly simplified and the time required to perform this work is materially reduced by eliminating most of the manual work heretofore required.

A principal feature of the invention consists in arranging alongside of the fruit advancing conveyer a pair of laterally spaced rollers which jointly constitute a support onto which the fruit may be transferred from the conveyer for inspection and trimming, at least one of the rollers being driven so that the fruit placed in engagement therewith will be caused to revolve.

Another feature of the invention consists in so arranging the pairs of rollers with respect to the conveyer that the pineapple cylinders may be rolled from the conveyer onto the rollers and from the latter back onto the conveyer, thus making it unnecessary for an operator to lift the fruit either to remove it from the conveyer or to place it back on it.

Another feature of the invention consists in providing the trimming table with walls which converge downwardly beneath the trimming rollers and conveyer so as to direct the trimmings from the fruit into the path of movement of the lower reach of the conveyer whereby the trimmings are conveyed from the table.

Other and more specific features of the invention, residing in advantageous forms, combinations and relations of parts, will hereinafter appear and be specifically pointed out in the claims.

In the drawings, illustrating a preferred embodiment of the invention,

Figure 1 is a plan view of the inspecting and trimming table.

Figure 2 is a side view of the table.

Figure 3 is an enlarged view taken on line 3—3 of Figure 1.

Figure 4 is an enlarged fragmentary sectional view taken on line 4—4 of Figure 1.

Figure 5 is an enlarged sectional view of one of the trimming rollers.

In the drawings, 1 indicates the inspecting and trimming table which may be conveniently provided with a plurality of pairs of upright legs 2, each pair of legs being preferably connected by upper and lower cross pieces 3 and 4 respectively. Upwardly and outwardly inclined members 5 rigidly connect the upper ends of the legs 2 with the side frame members 6 which extend from one end of the table to the other. Members 5 also serve to brace the walls 7 of the table which converge downwardly and thus form a trough or the like, the lower portion of which may be supported by the upper cross pieces 3.

The side frame members 6 of the table are connected by a plurality of transverse members 8, each of which is formed to provide a centrally located recessed portion 9 for receiving oppositely disposed angle members 10 which extend from one end of the table to the other and afford a support for a trough 11 along which the cylinders of pineapple are advanced from a Ginaca machine (not shown) to mechanism (also not shown) for slicing the pineapple.

The trough 11 has downwardly converging portions 12 arranged on opposite sides of a longitudinally extending recessed portion 13 through which the upper reach of an endless conveyer 14 is adapted to move. The conveyer may be advantageously of the sprocket chain type and pass around sprocket wheels 15 respectively mounted upon suitably located shafts 16 and 17. Shaft 16 may be supported in any convenient manner on the table and shaft 17 may, if desired, comprise the slicer shaft of the slicing mechanism which is shown as being mounted on brackets 18.

By mounting one of the sprocket wheels on the slicer shaft, the conveyer may be easily driven without providing additional mechanism for that purpose.

Secured to the conveyer are a plurality of attachments or arms 19 which are adapted to project upwardly from the recessed portion 13 of the trough 11 to engage cylinders of pineapple which pass from the Ginaca machine onto the trough and thus propel or advance the fruit along the trough. The attachments or arms 19 are spaced apart a distance somewhat greater than the length of the pineapple cylinders.

Disposed on each side of the upper reach of the conveyer are a plurality of pairs of laterally spaced driven rollers 20 whose axes extend substantially parallel with the direction of movement of the conveyer. The rollers of each pair are rotated in the same direction and they jointly serve as a support onto which fruit being advanced by the conveyer may be transferred for inspection and trimming. The rollers are preferably positioned in such close proximity to the upper reach of the conveyer that the cylinders of pineapple can be rolled from the conveyer onto the rollers and from the latter back onto the conveyer without the necessity of lifting them.

By having the rollers of each pair rotate in the same direction, cylinders of pineapple which are placed thereon will immediately begin to revolve and they may be, therefore, readily and quickly inspected and trimmed. The trimming may be easily accomplished while the fruit is rotating if, as is intended, it is caused to revolve in such manner that the upper or top portion thereof moves toward the operator. With the pineapple revolving in this manner, the operator may hold the trimming knife with the sharp edge thereof pointing away from him and insert the knife at any place on the upper portion of the fruit requiring trimming. As the pineapple continues to revolve, it will pull through the knife and the undesirable portion thereof is consequently removed with a minimum of effort by the operator.

The corresponding rollers of each pair are preferably fixedly mounted on shafts 21 which extend continuously from substantially one end of the table to the other and which are carried by the transverse members 8. While the shafts 21 may be rotated in any convenient manner to drive the rollers, this may be advantageously accomplished by providing the slicer shaft 17 with bevel gears 22 which mesh with bevel gears 23 respectively mounted on stub shafts 24 having sprocket wheels 25 for respectively driving sprocket chains 26 which pass around sprocket wheels 27 rigidly mounted on the adjacent ends of the shafts 29.

As illustrated in detail in Figure 5, each of the rollers may be conveniently formed of relatively short sections of tubing, the ends of which are closed by disks 28 having aligned apertures for receiving the shaft 21 on which the roller is mounted. The aperture in one of the disks may be provided with a bushing 29 for receiving a set screw 30 by which the roller is fixedly secured in the desired location on the shaft.

The pairs of rollers on one side of the conveyer are preferably arranged in staggered relation with respect to the pairs of rollers on the other side of the conveyer so that operators working on opposite sides of the table will not be directly opposite each other and thus will not interfere with one another. Seats 31 may be conveniently provided on which the operators may sit while trimming and inspecting the fruit. These seats may be mounted on longitudinally extending members 32 which are secured to the outer ends of continuations 33 of the lower cross pieces 4 of the legs 2 of the table.

In the operation of the machine, the operators who are positioned along opposite sides of the table remove the cylinders of pineapple from the conveyer as they are being advanced thereby from the Ginaca machine to the slicing mechanism by merely rolling them onto the rollers where they are caused to revolve and thus be readily inspected and trimmed. Upon completion of this operation, the pineapple cylinders are rolled back onto the conveyer to enable them to continue their advancement to the slicing mechanism.

The trimmings removed from the fruit fall into the trough formed by the inclined walls 7, being directed by the latter into the path of movement of the arms or attachments 19 on the lower reach of the conveyer by which they are propelled along the trough and are caused to discharge into a transversely extending conveyer 34 located at one end of the table.

Longitudinally extending shafts 35 may be respectively arranged beneath the rollers of each pair so as to prevent pineapples which may be accidentally knocked from the rollers or the conveyer 14 from falling into the trough formed by the walls 7 of the table, where they might be conveyed away by the lower reach of the conveyer before being retrieved. Furthermore, as a protection to the operators, sheet metal guards 36 may be loosely mounted on the portions of the shafts 21 which extend between the rollers nearest the side edges of the table.

While I have illustrated and described the preferred embodiment of my invention, it will, of course, be apparent to those skilled in the art that various changes and modifications may be made therein without departing from the spirit of the invention as defined in the appended claims.

What I claim is:

1. The improvement in fruit inspecting and trimming tables of the type having an endless conveyer, the upper reach of which is adapted to advance the fruit, said improvement including a pair of laterally spaced rollers arranged alongside of the upper reach of the conveyer, said rollers jointly constituting a support onto which fruit may be transferred from the conveyer for inspection and trimming, means for rotating at least one of said rollers so as to revolve the fruit in engagement therwith and thus enable the fruit to be inspected and trimmed, and downwardly converging walls defining a trough beneath said rollers and conveyer to receive trimmings from the fruit, said walls being arranged so as to direct said trimmings into the path of movement of the lower reach of the conveyer whereby the trimmings are conveyed along said trough.

2. The improvement in fruit inspecting and trimming tables of the type having an endless conveyer, the upper reach of which is adapted to advance the fruit along the table, said improvement including a plurality of pairs of rollers arranged on each side of the upper reach of the conveyer, the rollers of each pair being laterally spaced and jointly constituting a support onto which fruit may be transferred from the conveyer for inspection and trimming, means for rotating said pairs of rollers so as to cause the fruit placed thereon to revolve and thus enable it to be inspected and trimmed, and walls converging downwardly beneath said rollers defining a trough for receiving trimmings from the fruit, said walls being arranged so as to direct said trimmings into the path of movement of the lower reach of the conveyer whereby the trimmings are conveyed along said trough.

3. The improvement in fruit inspecting and trimming tables of the type having an endless conveyer for advancing cylinders of pineapple toward and past a point of inspection with the axes of the cylinders extending in the direction of movement of the conveyor, said improvement including a pair of rotatable rollers arranged alongside of the conveyer intermediate the ends thereof and positioned relative to each other to form jointly a support onto which cylinders of pineapple advanced by the conveyor may be transferred for inspection and trimming and from which the inspected and trimmed cylinders may be retransferred to the conveyer for further advancement, and means for rotating at least one of the rollers of said pair so that the fruit supported on the rollers is caused to revolve and thus be subject to inspection, said rollers being positioned in fixed relation to each other and to the conveyer and being of a character to rotatably support the cylinders of fruit without moving them axially so that the fruit is maintained in a relatively fixed position while being revolved for inspection, the axes of said rollers being substantially parallel with the direction of movement of the conveyer so that the cylinders of pineapple may be moved to and from the rollers and supported on the latter with their axes in the same relation to the direction of movement of the conveyer as when the cylinders are being advanced by the conveyer.

4. The improvement in fruit inspecting and trimming tables of the type having an endless conveyer for advancing cylinders of pineapple toward and past a point of inspection with the axes of the cylinders extending in the direction of movement of the conveyer, said improvement including a pair of rotatable rollers arranged alongside of the conveyer intermediate the ends thereof and positioned in fixed relation to each other with their axes substantially parallel with the direction of movement of the conveyer to form jointly a support onto which cylinders of pineapple advanced by the conveyer may be transferred for inspection and trimming and from which the inspected and trimmed cylinders may be retransferred to the conveyer for further advancement, and means for rotating at least one of the rollers of said pair so that each cylinder of pineapple supported on the rollers is caused to revolve for inspection, said rollers being of a character to support the cylinders of fruit in a relatively fixed position while being revolved for inspection and being disposed in such proximity to the conveyer that the cylinders may be rolled therefrom onto the rollers and from the latter back onto the conveyer.

GEORGE W. MARTIN.